United States Patent [19]

Manger

[11] 4,029,171

[45] June 14, 1977

[54] MEMBRANE FOR ELECTROACOUSTIC CONVERTER SYSTEMS

[76] Inventor: Josef Wilhelm Manger, Karlstadter Strasse, 8725 Arnstein, Germany

[22] Filed: Aug. 11, 1975

[21] Appl. No.: 603,310

[30] Foreign Application Priority Data

Jan. 7, 1975  Germany .......................... 2500397

[52] U.S. Cl. ................................ 181/167; 181/166; 181/170
[51] Int. Cl.² .................... G10K 13/00; H04R 7/00
[58] Field of Search ........... 181/166, 167, 168, 170

[56] References Cited

UNITED STATES PATENTS

| 2,834,424 | 5/1958 | Badmaieff | 181/166 |
| 3,093,207 | 6/1963 | Bozak | 181/166 |
| 3,111,187 | 11/1963 | Barlow | 181/170 |
| 3,154,172 | 10/1964 | Tibbetts | 181/170 |
| 3,285,364 | 11/1966 | Cohen | 181/166 |
| 3,586,792 | 6/1971 | Gaylord | 181/167 |
| 3,603,427 | 9/1971 | Sotome | 181/166 |
| 3,834,486 | 9/1974 | Tsuge et al. | 181/170 |

*Primary Examiner*—Stephen J. Tomsky

[57] ABSTRACT

A diaphragm having a flat multi-layer body with at least one layer of viscoelastic material.

9 Claims, 4 Drawing Figures

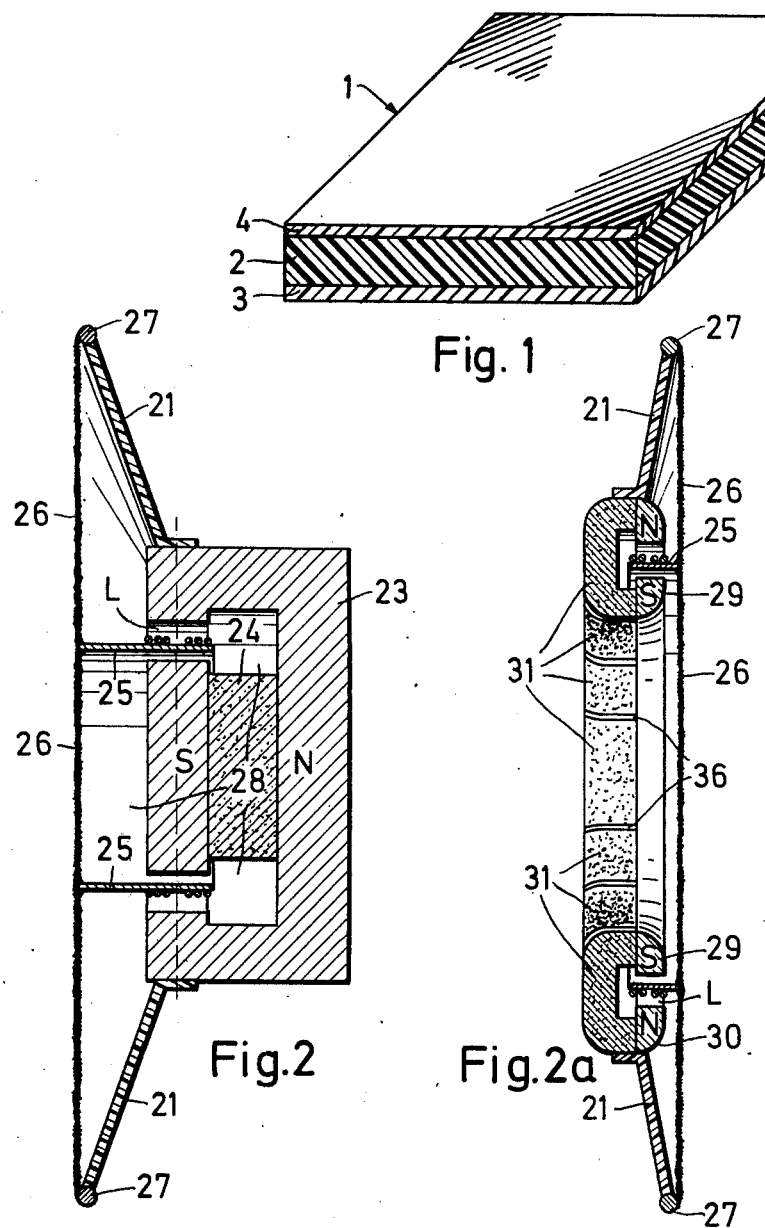

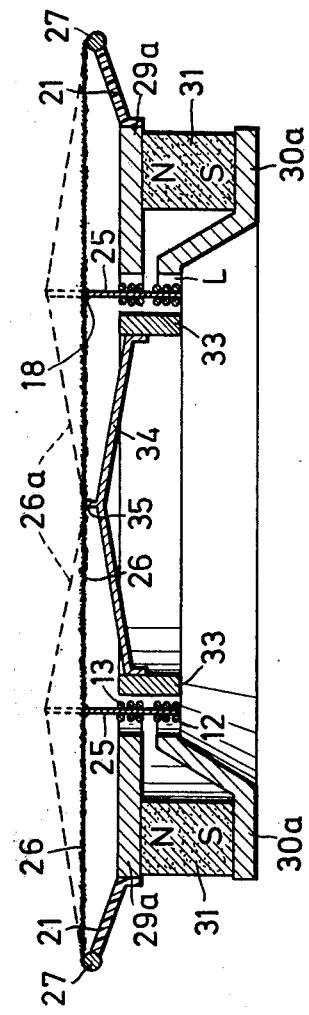

MEMBRANE FOR ELECTROACOUSTIC CONVERTER SYSTEMS

The invention concerns a membrane for electroacoustic converter systems which in the plane of support consists of viscoelastic material which exhibits low retractile elasticity.

Membranes of this kind are known from U.S. Pat. No. 3,937,905. They serve to fashion an electroacoustic converter system which has practically no mechanical energy store and unlike conventional electroacoustic converters is essentially characterized in that it features a membrane with largely viscoelastic behaviour, electromagnetic centering for the membrane U.S. Pat. No. 3,686,446 and no spurious air cushion before or behind the membrane.

The known membrane consists for example of knit or warp fabric impregnated with a butadiene based dispersion solution. Such a membrane is distinguised by great inhibition due to retardation or resistance with comparatively low inhibition caused by elastic forces or inertia, and in consequence of this, for instance, the phase relations between the individual frequencies transmitted remain practically unchanged regarding the converter as a transmission element.

The materials used hitherto for the production of viscoelastic membranes have various disadvantages. One major disadvantage consists in that the damping materials produce the desired heavy damping only over a definite, small range of temperatures, and at other temperatures the damping is slight, so that the membranes are not adequately temperature-stable. If, on the other hand, intensively damping fillers with less dependence on temperature are introduced, then the mechanical strength of these materials is not sufficient, especially at the fastening site between the moving coil and the membrane, to transmit adequately large forces from the moving coil to the membrane and thereby produce the required high sound-pressure level.

The underlying purpose of the invention is therefore to fashion a membrane of the above-mentioned kind which will have the desired heavy damping over a much greater temperature range and nevertheless permit greater sound-pressure levels than the known membranes.

The proposed membrane is characterized in that it consists of a multi-layer body which shows at least one layer of viscoelastic material with an almost constant maximum damping factor over a temperature range of more than 10° C and at least one layer of foil with a modulus of elasticity of more than 10,000 kg/cm$^2$.

Preferably suited to the viscoelastic layer are damping materials which have a large damping factor over a wide temperature band and are applied, for example, as anti-boom agents for sheet structures. Anti-boom agents are already known which consist of largely amorphous copolymers of vinyl esters of fatty acids with two or three carbon atoms and ethylene or esters of alcohols with four to twelve carbon atoms and acrylic- and maleic acid, i.e. copolymers which are produced by copolymerization of monomers, the homopolymers of which differ at least 20° C in their freezing point Belgean Pat. No. 598,603 published June 28, 1961. Still better suited seem to be certain graft-type polymers, also already known, namely, on the one hand, copolymers of styrene or styrene with small quantities of a copolymerizable carboxylic acid or styrene/acrylonitrile-mixture based on vinylacetate/ethylene copolymers (German Pat. Nos. 1, 301, 662, 1, 301, 664, 1, 301, 665 and 1, 301, 666) all published Aug. 21, 1969 and, on the other hand, styrene/acrylonitrile, styrene or methacrylic-acid methyl ester on copolymers from vinyl acetate, suitable esters of unsaturated, polymerizable carboxylic acids and an unsaturated, copolymerizable acid (German Pats. No. 1, 301, 663, published Aug. 21, 1969, or German Offenlegungsschriften Nos. 1, 694, 225 to 1, 694, 228 all published July 22, 1971).

The viscoelastic layer of the proposed membrane consists preferably of a graft-type polymer of methacrylic-acid methyl ester or methacrylic-acid methylester/acrylic-acid on vinyl-acetate/2-ethyl-hexyl-acrylate/dibuthylmaleate/crotonic-acid copolymers. By suitable choice and/or combination of the grafted substances sound absorbents can be produced, the damping factors of which are approximately equal to their maximum value in the temperature range from 0° to 60° C, and so lead to membranes which exhibit almost equally satisfactory mechano-acoustic properties at all temperatures present in a loudspeaker system.

The membrane expediently consists of a three-layer body with one middle layer of viscoelastic material and two outer layers of foil, which can for example be a normal polyester or polyvinylfluoride foil.

An electroacoustic converter system with a membrane of this kind is characterized in that the moving coil is mechanically coupled to one of the layers of foil.

Electroacoustic converter systems can be made with much less dependence on temperature and with much greater radiation power with the proposed membranes because the outer layers of foil ensure that even when using largely temperature-independent damping materials which mechanically, however, are very unstable, adequately great power can be transmitted from the moving coil across the foil to the damping material, and thus much larger membrane surfaces can be set in oscillation than when the foil is omitted.

In order to avoid the membrane becoming elastic or, more particularly, tensile elastic in the plane of support owing to the use of particular foil, and therefore, acting as an energy store, preferably a pattern in the form of surface deformations is imprinted in the foil for multiple interruption of the tension lines. As a result, on the one hand, in the presence of the slightest elasticity in tension the outer layers of foil serve practically only for power transmission, whilst on the other hand the surface elements of the membrane owing to the action of the proposed copolymer are bound nearly alone by frictional coupling.

The invention will now be described by way of example with reference to the accompanying drawings in which:

FIG. 1 is a perspective view of a membrane embodying the invention, and

FIGS. 2, 2a and 3 are sectional views of three transducers embodying the invention.

The proposed membrane consists of a multi-layer body 1, the middle layer 2 of which consists of material which displays markedly viscoelastic behaviour over a wide temperature range from, for example, 0° to 60° C. Suitable viscoelastic materials are, more particularly, graft-type polymers of methacrylic-acid methyl ester or methacrylic-acid methyl ester/acrylic acid on vinyl-acetate/2-ethyl-hexyl-acrylate/dibutylmaleate/crotonic-acid-copolymers. Externally fitted on the middle layer 2 are the respective layers 3 and 4 of mechanically stable foil such as polyester-, polycarbonate- or polyvinylfluoride-foil with a modulus of elasticity of more than 10,000 kg/cm². Very suitable foil materials are the plastics known under the trade-names "Mylar", "Makrofol" and "Tedlar".

The thickness of the layers 3 and 4 is generally relatively small in comparison with the thickness of layer 2. Whereas the layers 3 and 4 can, for example, display a thickness of 0.01 to 0.04 millimeters, the thickness of layer 2 is preferably about 0.2 to 0.4 millimeters. The proposed membranes are produced, for example, in the following way: A layer of foil is applied to each of two flat or pattern-imprinted heating plates between which a weighed quantity of the proposed copolymer is introduced, this substance also displaying the properties of a fusible adhesive. Depending on the copolymer used, the heating plates are finally raised to a temperature of, say, 140° to 180° C and at the same time or thereafter they are pressed together at a constant pressure of, for instance, 3 to 4 atmospheres. The copolymer hereby begins to melt and, as the heating plates come increasingly closer together, it spreads out until within a few minutes it is uniformly distributed between the two heating plates and the desired thickness of the layer is reached. In conclusion the two heating plates are switched "off" and removed so that the membrane can be taken out, cut to size, if necessary, and coupled to the moving coil.

The tranducer shown in FIG. 2, which is a loudspeaker, has a single pot magnet 23 and (as indicated in FIG. 2) two moving coils in tandem arrangement in the air gap L of the magnet. A diaphragm 26 is fixed to a hollow cylindrical former 25 supporting the moving coils; the marginal edge of this diaphragm is rigidly clamped down by an outer ring 27 which is fixed by a suitable bracket 21 to the pot magnet 23. The centre of the circular diaphragm 26 can also be retained in a fixed position with a pin fitted to the pot magnet. These details are not shown on the drawing. In the rest position of the diaphragm the moving coil axis is perpendicular to the diaphragm.

The radiating surface of diaphragm 26 (FIG. 2) is not circumscribed by the moving coil former 25 but also includes the area of the diaphragm stretched between the former 25 and the ring 27. Within the moving coil former 25, the diaphragm 26 is flat. Centering of the diaphragm 26 is as in the transducers described in British Pat. No. 1,286,687 and U.S. Pat. No. 3,686,446.

Behind the diaphragm 25, the inner and outer pole shoes of the pot magnet 23 form detrimental dead-ended air pockets 28. This can be avoided by employing the magnet shown in FIGS. 2a, which has two annular pole shoes 29, 30 and a plurality of permanent magnets 31 arranged in a circle and spaced from one another leaving spaces 36 free. The pole shoes are of a sintered metal which is electrically conductive but pervious to air.

The embodiment according to FIG. 3 differs from that in FIG. 2a by the fact that the air gap L is bordered on the one side by two outer pole shoes 29a, 30a of permanent magnets 31 and on the other side by a core 33 having the function of and being constructed as a pole shoe ring. The core 33 is fixed to the pole shoes 29a, 30a by webs of a non-magnetic material (not shown). This offers a decisive advantage because there are no trapped air spaces 28 (FIG. 2) at all. A pin 35, supported by thin webs 34, fixes the centre of diaphragm 26. In operation the diaphragm consequently oscillates both between the ring 27 and the moving coil former 25 and between the former 25 and the pin 35. The maximum expected normal excursion of the diaphragm is indicated by the dotted line 26a in FIG. 3. The diaphragm is such that in this condition it does not act as an elastic energy accumulator even in this position.

The diaphragm 26 is as described with reference to FIG. 1.

The transducers described with reference to FIGS. 2a and 3 are moving-coil loudspeakers in which motion of the diaphragm 26 is effectively resistance controlled. This is due to the low mass of the driven parts of the transducer, and the effective absence of compliance of the diaphragm 26 and other elements acting on the coils, the coils being driven and centred as described in U.S. Pat. No. 3,686,446.

What I claim is:
1. Diaphragm having substantial viscoelastic properties for an electroacoustic transducer system and coupled to a driving means therefor, consisting of a flat multi-layer body which has at least one layer of a substantially viscoelastic material with a substantially constant maximum damping factor over a temperature range of substantially more than 10° C and at least one layer of foil with a modulus of elasticity of more than 10,000 kg/cm².

2. Diaphragm as in claim 1, wherein said viscoelastic material consists of a graft-type polymer of methacrylic-acid methylester on vinylacetate/2-ethyl-hexyl-acrylate/dibutyl-maleate/crotonic-acid copolymer.

3. Diaphragm as in claim 1, wherein said viscoelastic material consists of a graft-type polymer of methacrylic-acid methylester/acrylic acid on vinylacetate/2-ethyl-hexyl-acrylate/dibutyl-maleate/crotonic-acid copolymer.

4. Diaphragm as in claim 1, wherein said foil consists of a polyester-film.

5. Diaphragm as in claim 1, wherein said foil consists of a polycarbonate-film.

6. Diaphragm as in claim 1, wherein said foil consists of a polyvinylfluoride-film.

7. Diaphragm as in claim 1, the multi-layer body containing a middle layer of viscoelastic material and outer layers of foil on both sides.

8. Diaphragm as in claim 7, wherein said middle layer has a layer-thickness of 0.2 to 0.4 mm and each outer layer has a layer-thickness of 0.01 to 0.04 mm.

9. Electroacoustic transducer system with a flat diaphragm having substantial viscoelastic properties secured to a fixed part and coupled to a moving coil, wherein the diaphragm consists of a multi-layer body which has at least one diaphragm-coupled layer of foil with a modulus of elasticity of more than 10,000 kg/cm², and at least one layer of viscoelastic material with a substantially constant maximum damping factor over a temperature range of more than 10° C.

* * * * *